(12) United States Patent
Taylor et al.

(10) Patent No.: US 6,501,198 B2
(45) Date of Patent: *Dec. 31, 2002

(54) CONTROL LEVER FOR HEAVY MACHINERY WITH NEAR-PROXIMITY SENSING

(75) Inventors: Richard G. Taylor, McConnellsburg, PA (US); Louis A. Bafile, Mercersburg, PA (US)

(73) Assignee: JLG Industries, Inc., McConnellsburg, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/505,781

(22) Filed: Feb. 17, 2000

(65) Prior Publication Data

US 2002/0158518 A1 Oct. 31, 2002

(51) Int. Cl.⁷ .............................................. G05G 9/047
(52) U.S. Cl. ........................ 307/326; 307/9.1; 307/328
(58) Field of Search ................................ 307/326–328, 307/9.1, 10.1; 340/573.1, 576

(56) References Cited

U.S. PATENT DOCUMENTS

| | | | |
|---|---|---|---|
| 3,177,481 A | | 4/1965 | Joy et al. |
| 3,833,898 A | | 9/1974 | Wilkinson |
| 4,106,810 A | * | 8/1978 | Barecki ........................ 297/183 |
| 4,156,575 A | * | 5/1979 | Konig et al. ................... 404/84 |
| 4,412,268 A | | 10/1983 | Dassow |
| 4,489,805 A | | 12/1984 | Okabe |
| 4,526,055 A | | 7/1985 | Batchelor et al. |
| 4,656,461 A | | 4/1987 | Morsch et al. |
| 4,738,417 A | | 4/1988 | Wenger |
| 4,792,052 A | * | 12/1988 | Okuda et al. ................. 212/162 |
| 4,794,273 A | * | 12/1988 | McCullough et al. ........ 307/139 |
| 5,207,481 A | * | 5/1993 | Ayala, Jr. et al. ............. 297/464 |
| 5,328,128 A | * | 7/1994 | Morris .......................... 242/283 |
| 5,341,036 A | | 8/1994 | Wheeler et al. |
| 5,380,983 A | * | 1/1995 | Cavada et al. ................ 219/250 |
| 5,396,222 A | | 3/1995 | Markus et al. |
| 5,498,914 A | | 3/1996 | De Boer |
| 5,844,204 A | | 12/1998 | Cubizolles et al. |
| 5,860,488 A | | 1/1999 | Kim |
| 6,102,022 A | * | 8/2000 | Schave ....................... 125/13.01 |
| 6,218,947 B1 | * | 4/2001 | Sutherland .................... 340/576 |

FOREIGN PATENT DOCUMENTS

| | | |
|---|---|---|
| DE | 43 44 187 A1 | 6/1995 |
| EP | 0 701 917 A1 | 3/1996 |

OTHER PUBLICATIONS

QProx™ QT110 Charge–Transfer Touch Sensor Operating Manual, Quantum Research Group Ltd., 1999, 12 pgs.

* cited by examiner

*Primary Examiner*—Fritz Fleming
(74) *Attorney, Agent, or Firm*—Nixon & Vanderhye P.C.

(57) ABSTRACT

A control lever for heavy machinery includes a proximity sensor for reducing the likelihood of inadvertent activation of the heavy machinery components. The proximity sensor is disposed adjacent an operating position of the control implement and detects when an operator's hand is in an operating position on the control implement in accordance with a capacitance of the operator's hand. The sensing circuit outputs an activate signal to a controller circuit for controlling the heavy machinery components when the operator's hand is in the operating position on the control implement. As a consequence, the operator is not required to perform excessive operations to effect control of the heavy machinery and has both hands available for machine operation.

15 Claims, 2 Drawing Sheets

CONTROL LEVER FOR HEAVY MACHINERY WITH NEAR-PROXIMITY SENSING

BACKGROUND OF THE INVENTION

The present invention relates to a control lever for heavy machinery and, more particularly, to a control lever for heavy machinery including a safeguard against inadvertent operation using near-proximity sensing.

Many types of equipment utilize joysticks, twist grips, paddles and other types of hand-operated levers for controlling machine motion. Because of the potential consequences of accidentally or inadvertently operating a lever, it may be advisable for manufacturers to provide safeguards against such events. These safeguards are typically achieved by requiring the operator to perform a sequence of movements or selections that indicate the operator's intent to control the machine before the lever will cause machine motion. Although a single additional activity has been common, some regulations are now requiring two levels of safeguard against unintended motion.

Conventional types of mechanisms that reduce the likelihood of inadvertent motion used in the industry include foot switches, enable switches, trigger switches and the like. These switches are used in combination to achieve two-level safeguards when required. Each of these mechanisms, however, has disadvantages.

A foot switch works well in that both of the operator's hands are free to perform other functions. A foot switch, however, is not practical if the control console, which incorporates the hand levers, must be moved from place to place for convenience of operation or security. Moreover, the foot switch is an electromechanical device, subject to mechanical and environmental failure and tampering.

An enable switch must be continuously held on with one hand while the control is being operated with the other, or must be momentarily selected to activate a timing circuit to provide power to the lever-operated controller. The continuous-hold type switch has a major disadvantage in any type of equipment where both hands are used to perform multiple simultaneous functions. The momentary contact type switch has a disadvantage of requiring a compromise in the length of time that the controls are enabled after pressing the switch.

A trigger switch is built into a hand lever and is activated by gripping a lever handle. Because releasing the switch normally turns off all power to the controller, the machine and its components may come to an abrupt stop if the switch is released. Therefore, the operator must retain a firm grip on the trigger switch while at the same time controlling machine motion in several directions. The resulting operation may be awkward and tiring for the operator.

A mechanical lock may be incorporated into a lever assembly that is designed to automatically snap into the locked position when the lever is released. The lock must then be moved out of the locked position to allow the lever to be moved from its neutral position. A disadvantage of mechanical locks is that the control lever often must survive use in harsh environmental conditions, with parts including small springs and sliding pieces of a locking mechanism that may stick in the unlocked position.

SUMMARY OF THE INVENTION

It is an object of the present invention to provide equipment for guarding against unintended motion of a hand-operated control lever for heavy machinery without the disadvantages of foot switches, enable switches, trigger switches, mechanical locks and the like. Unintended machine motion may be caused by a variety of circumstances, including an operator brushing against a lever with his back turned, by catching a lever with a tool belt, or by a piece of material falling on the lever, etc. With an operator's hand properly placed on or around the lever, it can be assumed that the operator intends to operate the machine. Thus, by sensing, without contact, the presence of an operator's hand in a proper operating position on the control lever, a guard against inadvertent motion can be provided without requiring additional efforts on the part of the operator.

In an exemplary embodiment of the invention, a control lever for heavy machinery includes a control implement and a proximity sensor disposed adjacent an operating position of the control implement. The control implement is coupled with a controller circuit that effects control and operation of the heavy machinery. The controller circuit drives components of the heavy machinery according to movements of the control implement. The proximity sensor includes a sensing circuit communicating with the controller circuit that detects an operator's hand in an operating position on the control implement in accordance with a capacitance of the operator's hand. The sensing circuit outputs an activate signal to the controller circuit when the operator's hand is in the operating position on the control implement, thereby reducing the likelihood of inadvertent activation of the heavy machinery components.

The proximity sensor is preferably embedded in the control implement, spaced from an exterior surface of the control implement at least 0.1". Alternatively, the proximity sensor may be disposed covering the control implement. In yet another alternative, the proximity sensor is molded in a self-skinning urethane foam grip of the control element.

In accordance with another aspect of the invention, a method of reducing the likelihood of inadvertent operation of heavy machinery includes (a) providing a control implement coupled with a controller circuit that effects control and operation of the heavy machinery, with the control circuit driving components of the heavy machinery according to movements of the control implement; (b) disposing a proximity sensor adjacent an operating position of the control implement, the proximity sensor including a sensing circuit communicating with the controller circuit; and (c) detecting an operator's hand in an operating position on the control implement in accordance with a capacitance of the operator's hand, and outputting an activate signal to the controller circuit when the operator's hand is in the operating position on the control implement.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Near-proximity sensing and switching has been known. Following Kirchoff's Current Law, this method of proximity sensing employs the capacitance of the human body, which can be distinguished from the presence of other objects. Sensors incorporating this principle have been used in, for example, elevator controls, ATM machines, public restroom water spigots, and the like, which sense the presence of human hands to operate various functions without the use of moving parts and also without necessarily actual contact.

Figure 1:
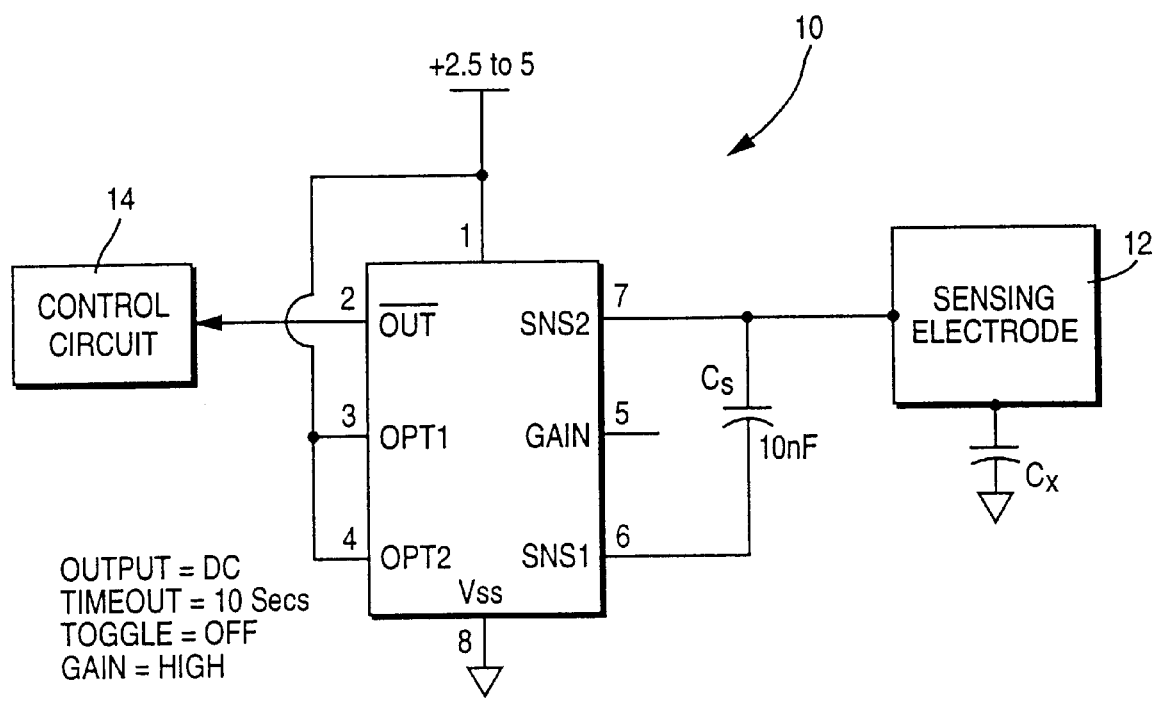
FIG. 1 is a circuit diagram for the touch-sensor circuit incorporated into the heavy machinery control lever according to the present invention.

FIG. 1 is a block diagram for a touch sensor circuit 10 including an electrode 12 incorporated into the control lever according to the present invention. The details of the structure and operation of the touch sensor circuit are known and will not be further described. A suitable sensor is the QPROX™ QT110 Charge-Transfer Touch Sensor available from Quantum Research Group, Ltd. of South Natick, Mass. A description of the details and functions of the touch sensor circuit and construction can be found in the Quantum Research Group Touch Sensor Operating Manual.

A control implement 20 for heavy machinery is coupled with a controller circuit 14 that effects control and operation of the heavy machinery. The controller circuit 14 effects driving of components of the heavy machinery according to movements of the control implement 20.

Generally, the electrode 12 or "antenna," is built into or embedded in the handle or lever 20 that is grasped by the operator. Kirchoff's Current Law is the principle used to detect the change in capacitance of the electrode 12. This Law, as applied to capacitive sensing, requires that the sensor's field current must complete a loop, returning back to its source in order for capacitance to be sensed. The human body naturally has "free space" capacitance to the local environment that is sufficient to create the return path. According to the invention, the electrode 12 thus detects when an operator's hand is in an operating position on the control implement 20 in accordance with the capacitance of the operator's hand. The sensing circuit 10 outputs an activate signal to a controller circuit 14 when the operator's hand is in the operating position on the control implement 20, thereby reducing the likelihood of inadvertent activation of the heavy machinery components.

Figure 2:
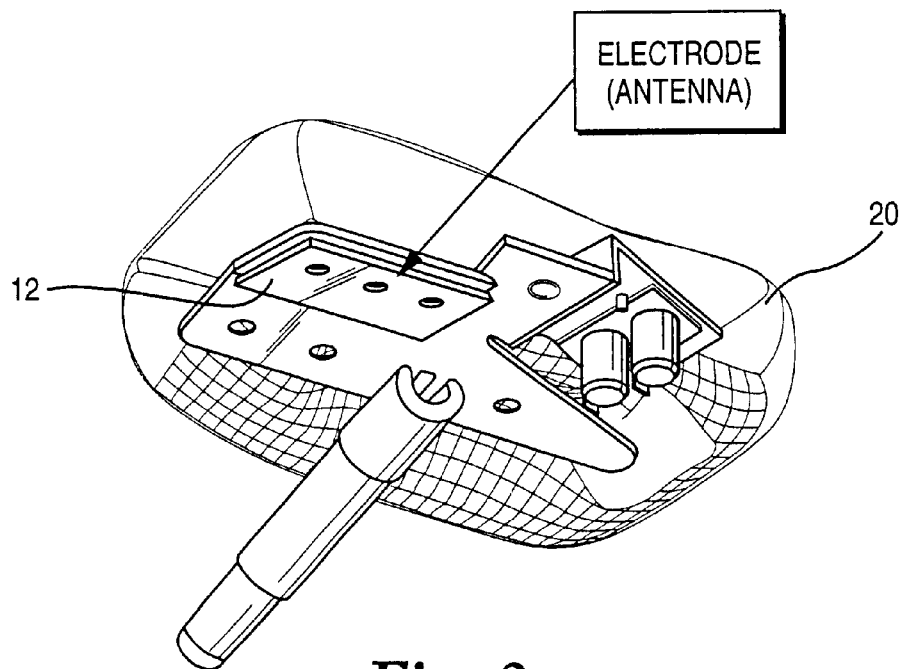
FIG. 2 is a perspective view of an exemplary embodiment control lever according to the invention.

FIG. 2 shows one exemplary embodiment of the invention, with the electrode 12 embedded into a control handle 20 shaped like a grip for use on rough-terrain equipment. The size, spatial placement and distance from the surface of the grip are variable design parameters that are adjustable according to the operator population. Considerations governing these parameters include the range of hand size of the operator population, the use of various style gloves, and environmental and mechanical protection for the electrode. The control handle 20 in FIG. 2 is preferably molded from a self-skinning urethane foam. In this embodiment, the electrode 12 is molded into the grip approximately 0.1" from the surface to protect the electrode 12 from the environment, thereby allowing it to be constructed from less expensive materials. Preferably, the sensor should be between 0"–0.75" from the surface, depending on the density and other characteristics of the material.

In addition to the design of the electrode, the circuitry may be adjusted to provide more or less sensitive operation, perform self-checking functions, and reduce the likelihood of attempts at overriding the safeguard feature. For example, referring to FIG. 1, the value of capacitor $C_S$ may be adjusted according to desired operating parameters, such as device sensitivity. Those of ordinary skill in the art will contemplate other ways to adjust the circuitry to suit particular needs, and the invention is not meant to be limited to the described example.

Figure 3:
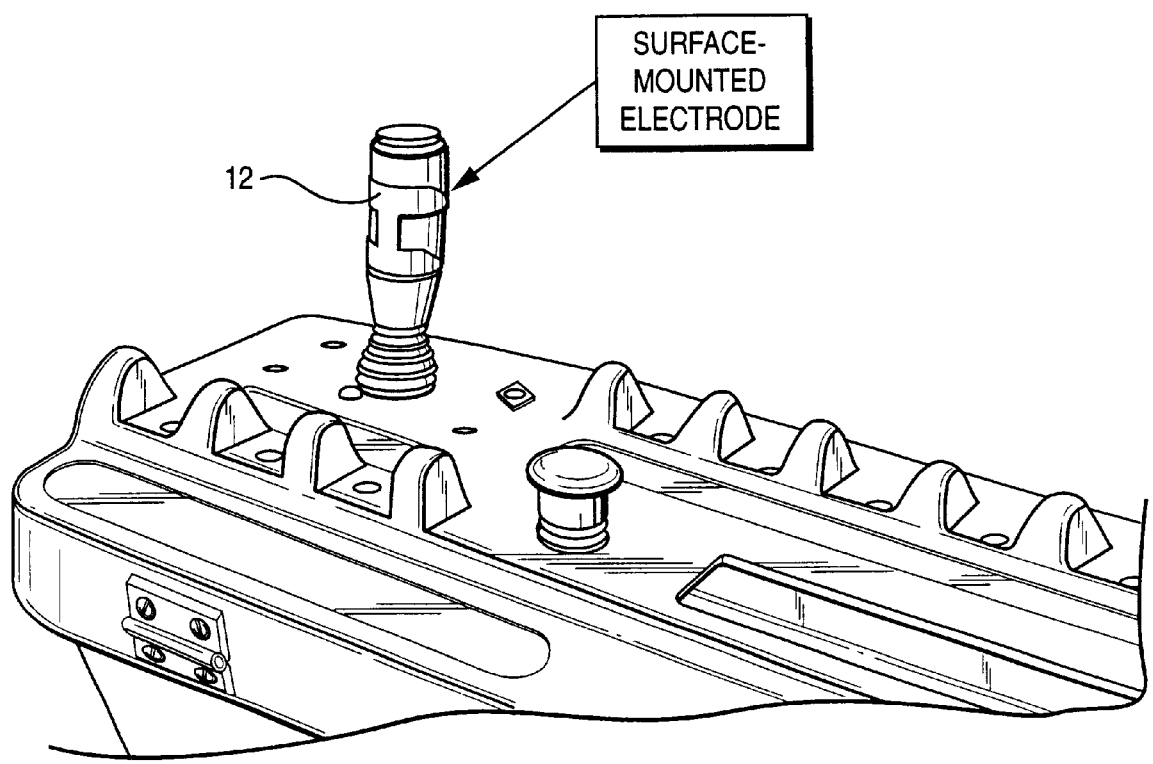
FIG. 3 shows an alternative exemplary embodiment control lever according to the invention.

FIG. 3 shows the electrode 12 mounted onto the surface of a conventional joystick type control lever 20. In this embodiment, the electrode 12 is formed of heavy gauge copper or the like and requires no physical protection. The size, shape and location of the electrode are such that a person's hand must surround the handle for the circuit to be activated.

With the structure according to the present invention, a proximity sensor provides the ability to sense a machine operator's intention to cause the machine to move without requiring the operator to consciously follow a sequence of button or switch operations to obtain the desired motion. The machine operation is thus automatic and not readily subject to tampering. The long-needed control lever construction according to the invention thus facilitates the construction and operation of an inadvertent motion safeguard switch.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control lever for heavy machinery comprising:

a movable control implement coupled with a controller circuit that effects control and operation of the heavy machinery, the control implement being movable in a plurality of directions to effect corresponding directional control of at least one component of the heavy machinery, the controller circuit driving the at least one component of the heavy machinery according to movements of the control implement; and a proximity sensor disposed adjacent an operating position of the control implement and including a sensing circuit communicating with the controller circuit, the sensing circuit detecting an operator's hand in an operating position on the control implement in accordance with a capacitance of the operator's hand, wherein the sensing circuit outputs an activate signal to the controller circuit when the operator's hand is in the operating position on the control implement, and wherein the sensing circuit prevents control and operation of the heavy machinery via the control implement when the operator's hand is not detected in the operating position, thereby reducing the likelihood of inadvertent activation of the heavy machinery components.

2. A control lever according to claim 1, wherein the proximity sensor is embedded in the control implement.

3. A control lever according to claim 2, wherein the proximity sensor is spaced from an exterior surface of the control implement.

4. A control lever according to claim 3, wherein the proximity sensor is spaced at least 0.1" from the exterior surface of the control implement.

5. A control lever according to claim 1, wherein the proximity sensor is disposed covering the control implement.

6. A control lever according to claim 1, wherein the proximity sensor is molded in a self-skinning urethane foam grip of the control implement.

7. A control lever for heavy machinery comprising:

a movable control implement coupled with a controller circuit that effects control and operation of the heavy machinery, the control implement including a gripping portion and being movable in a plurality of directions to effect corresponding directional control of at least one component of the heavy machinery via the controller circuit; and an electrode of a proximity sensor disposed adjacent the gripping portion, the electrode forming part of a sensing circuit communicating with the controller circuit that detects an operator's hand in an operating position on the gripping portion of the control implement by closing the sensing circuit in accordance with a capacitance of the operator's hand, wherein the sensing circuit outputs an activate signal to the controller circuit when the operator's hand is in the operating position on the control implement, and wherein the sensing circuit prevents control and operation of the heavy machinery via the control implement when the operator's hand is not detected in the operating position.

8. A control lever according to claim 7, wherein the electrode is embedded in the gripping portion.

9. A control lever according to claim 7, wherein the electrode is layered over the gripping portion.

10. A method of reducing the likelihood of inadvertent operation of heavy machinery components, the method comprising:

(a) providing a movable control implement coupled with a controller circuit that effects control and operation of the heavy machinery, the control implement being movable in a plurality of directions to effect corresponding directional control of at least one component of the heavy machinery, the controller circuit driving the at least one component of the heavy machinery according to movements of the control implement;

(b) disposing a proximity sensor adjacent an operating position of the control implement, the proximity sensor including a sensing circuit communicating with the controller circuit;

(c) detecting an operator's hand in an operating position on the control implement in accordance with a capacitance of the operator's hand, and outputting an activate signal to the controller circuit when the operator's hand is in the operating position on the control implement; and (d) preventing control and operation of the heavy machinery via the control implement when the operator's hand is not detected in the operating position.

11. A method according to claim 10, wherein step (b) is practiced by embedding the proximity sensor in the control implement.

12. A method according to claim 11, wherein step (b) is further practiced by spacing the proximity sensor from an exterior surface of the control implement.

13. A method according to claim 12, wherein the proximity sensor is spaced at least 0.1" from the exterior surface of the control implement.

14. A method according to claim 10, wherein step (b) is practiced by disposing the proximity sensor covering the control implement.

15. A method according to claim 10, wherein step (b) is practiced by molding the proximity sensor in a self-skinning urethane foam grip of the control implement.

* * * * *